United States Patent
Lee

(10) Patent No.: US 9,870,701 B2
(45) Date of Patent: Jan. 16, 2018

(54) APPARATUS AND METHOD FOR CONTROLLING OPENING AND CLOSING OF VEHICLE DOOR

(71) Applicants: Hyundai Motor Company, Seoul (KR); Kia Motors Corporation, Seoul (KR)

(72) Inventor: Hui Sung Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/333,523

(22) Filed: Oct. 25, 2016

(65) Prior Publication Data

US 2017/0124859 A1 May 4, 2017

(30) Foreign Application Priority Data

Nov. 2, 2015 (KR) .................. 10-2015-0153396
Jul. 21, 2016 (KR) .................. 10-2016-0092549

(51) Int. Cl.
*G08C 23/02* (2006.01)
*G07C 9/00* (2006.01)
(Continued)

(52) U.S. Cl.
CPC ........ *G08C 23/02* (2013.01); *B60R 21/01332* (2014.12); *G07C 9/00174* (2013.01);
(Continued)

(58) Field of Classification Search
None
See application file for complete search history.

(56) References Cited

U.S. PATENT DOCUMENTS 4,346,914 A * 8/1982 Livers ................ B60R 21/0136
180/274
6,556,124 B1 4/2003 Laroche
(Continued)

FOREIGN PATENT DOCUMENTS

CN 103863249 A 6/2014
JP 2010-095975 A 4/2010
(Continued)

OTHER PUBLICATIONS

"2017 All New Carnival High Limousine 7-Seater Gasoline has been shipped!" Jun. 29, 2016, Retrieved from the Internet: http://blog.naver.com/PostPrint.nhn?blogId=howblog&logNo=220749363000.

(Continued)

*Primary Examiner* — Leon-Viet Nguyen
(74) *Attorney, Agent, or Firm* — Mintz Levin Cohn Ferris Glovsky and Popeo, P.C.; Peter F. Corless

(57) ABSTRACT

An apparatus and method for controlling opening and closing of a vehicle door are provided. The apparatus includes a driving unit that opens and closes a door a controller that operates the driving unit. Additionally, an acoustic wave processing unit receives and analyzes an acoustic wave signal generated by force exerted onto the door to generate a control signal for opening or closing of the door. The controller receives the control signal to thus operate the driving unit. Further, the acoustic wave processing unit includes an acoustic wave sensor disposed inside of the door and receives the acoustic wave signal, and an MCU that analyzes a signal output from the acoustic wave sensor to generate the control signal.

11 Claims, 11 Drawing Sheets

(51) Int. Cl.
  *B60R 21/0132* (2006.01)
  *E05F 1/00* (2006.01)
(52) U.S. Cl.
  CPC ...... *E05F 1/00* (2013.01); *G07C 2009/00746* (2013.01); *G07C 2009/00801* (2013.01)

(56) References Cited

U.S. PATENT DOCUMENTS

| | | |
|---|---|---|
| 8,085,124 B2 | 12/2011 | Ing |
| 8,098,037 B2 | 1/2012 | Sugiura |
| 2008/0238135 A1* | 10/2008 | Takeda .................. B60R 25/24 |
| | | 296/146.4 |
| 2009/0120001 A1* | 5/2009 | Sugiura .................. E05F 15/70 |
| | | 49/324 |

FOREIGN PATENT DOCUMENTS

| | | |
|---|---|---|
| KR | 20-0391117 Y1 | 8/2005 |
| KR | 2011-0005050 A | 1/2011 |

OTHER PUBLICATIONS

"Holiday Season, Perfect for family "vacation" . . . Kia Motors releases 2017 Carnival," Jun. 14, 2016, Retrieved from the Internet: http://news1.kr/articles/?2690706.

"AUI Power Sliding Door," Jul. 4, 2016, Retrieved from the Internet: http://www.kia.com/kr/vehicles/carnical-hi-limousine/features.html.

"AUI Sliding Door," Jul. 4, 2016, Retrieved from the Internet: http://www.youtube.com/watch?v=MXkPuZDjPvo.

Office Action dated Sep. 19, 2017 in corresponding Korean Patent Application No. KR 10-2016-0092549.

\* cited by examiner

APPARATUS AND METHOD FOR CONTROLLING OPENING AND CLOSING OF VEHICLE DOOR

CROSS-REFERENCE TO RELATED APPLICATIONS

This application is based on and claims the benefits of priorities to Korean Patent Application Nos. 10-2015-0153396, filed on Nov. 2, 2015, and 10-2016-0092549, filed on Jul. 21, 2016, in the Korean Intellectual Property Office, the disclosures of which are incorporated herein in their entireties by reference.

BACKGROUND

Technical Field

The present disclosure relates to an apparatus and a method for controlling opening and closing of a vehicle door and, more particularly, to an apparatus and a method for controlling opening and closing of a vehicle door by generating an acoustic wave signal in response to a user knocking on the door and converting the acoustic wave signal into a control signal.

Related Art

As is well known in the art, a vehicle is equipped with electrically driven doors, i.e., power doors. The power door may be a power back door, a power sliding door, a gull-wing door, a sun roof, and the like. The power door includes an electric motor, a driving unit having a driving source such as a hydraulic cylinder, and a controller configured to operate the driving unit.

Meanwhile, an operation button or operation handle used for opening and closing the power door may be disposed on a panel of the door or near a driver seat of the vehicle. After the vehicle stops, the door may automatically be opened or closed by actuating the operation button or operation handle or using a remote controller such as a smart key. According to such conventional methods, however, the actuation or manipulation of the operation button or the like is quite cumbersome, and thus, automatic opening and closing operations of the door may be inconvenient.

SUMMARY

The present disclosure provides an apparatus and a method for controlling opening and closing of a vehicle door that automatically opens or closes the door more conveniently by analyzing an acoustic wave signal generated when a user is knocking on the door.

According to an aspect of the present disclosure, an apparatus for controlling opening and closing of a vehicle door may include: a driving unit configured to open and close a door of the vehicle; a controller configured to operate the driving unit; and an acoustic wave processing unit configured to receive and analyze an acoustic wave generated by knocking on the door to generate a control signal for opening or closing of the door, and configured to transmit the control signal to the controller. The acoustic wave processing unit may include an acoustic wave sensor disposed within the door and configured to receive the acoustic wave signal, and a micro control unit (MCU) configured to analyze a signal output from the acoustic wave sensor to generate the control signal.

According to another aspect of the present disclosure, a method for controlling opening and closing of a vehicle door may include: monitoring the acoustic wave signal generated by knocking on the door when a vehicle satisfies a stop condition; and generating a control signal for opening or closing the door by analyzing the monitored acoustic wave signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
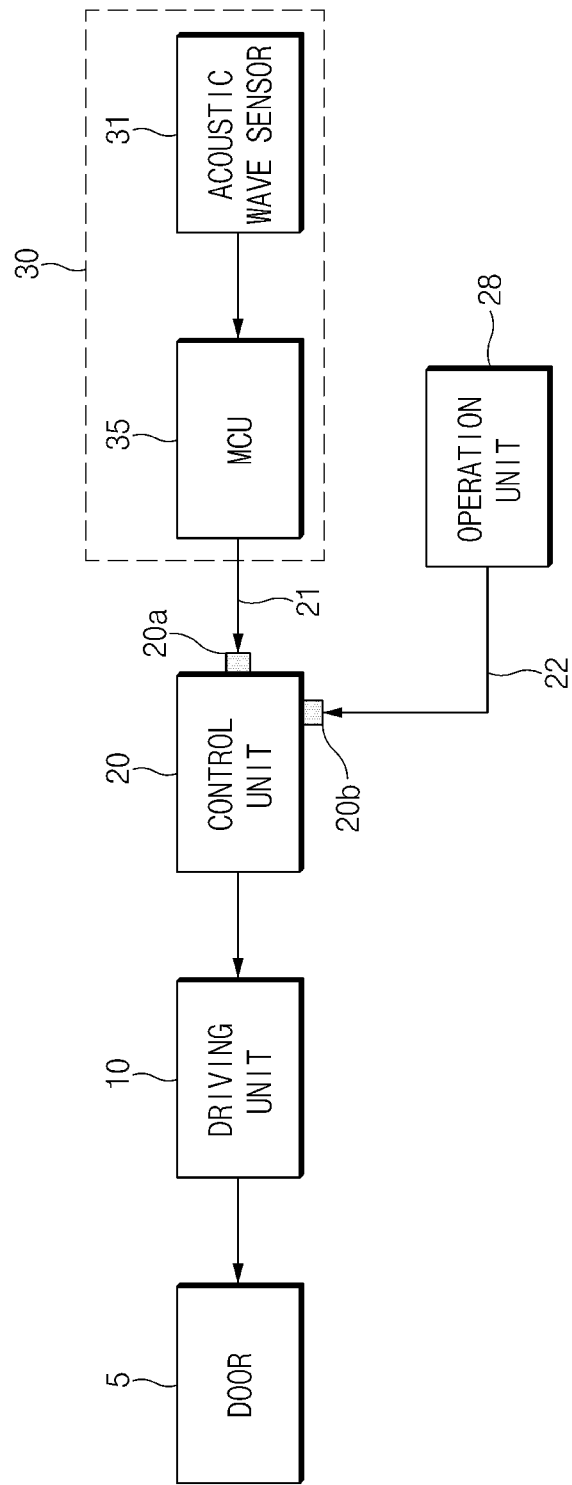
FIG. 1 is a block diagram illustrating an apparatus for controlling opening and closing of a vehicle door, according to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. For reference, the dimensions of elements, thicknesses of lines, and the like, illustrated in the drawings referred to in the description of exemplary embodiments of the present disclosure may be exaggerated for convenience of understanding. In addition, terms used for describing the present inventive concept have been defined in consideration of the functions of elements, and may be altered in accordance with the intention of a user or an operator, in view of practice, or the like. Therefore, the terms should be defined on the basis of the entirety of this specification.

Referring to FIG. 1, an apparatus for controlling opening and closing of a vehicle door, according to exemplary embodiments of the present disclosure may include a driving unit 10 configured to open and close a door 5 of the vehicle, a controller 20 configured to operate the driving unit 10, and an acoustic wave processing unit 30 configured to receive and analyze an acoustic wave generated by knocking (or beating, that is, force being exerted onto the door) on the door 5 to generate a control signal for opening or closing of the door 5.

The door 5, according to exemplary embodiments, may be a power door electrically driven by the driving unit 10 and the controller 20, and the power door may be a power back door, a power sliding door, a gull-wing door, a sun roof, and the like. The driving unit 10 may include an electric motor, a driving source such as a hydraulic cylinder, and a transmitter transmitting power of the driving source to the door 5. The controller 20 may be configured to operate the driving unit 10 to appropriately adjust the opening, closing, opening speed, closing speed, and the like of the door 5. The acoustic wave processing unit 30 may be configured to process the acoustic wave (or vibrations) signal generated by the force exerted on the door 5 to generate the control signal for the opening or closing of the door 5.

According to exemplary embodiments, the acoustic wave processing unit 30 may include an acoustic wave sensor 31 configured to receive the acoustic wave generated by knocking on the door 5, and a micro control unit (MCU) 35 configured to analyze a signal output from the acoustic wave sensor 31 to generate the control signal for opening or closing of the door 5. The acoustic wave sensor 31 may be indisposed within the door 5, and may be configured to receive the acoustic wave generated by knocking on the door 5. When the acoustic wave is generated by the force exerted onto the door 5, the acoustic wave sensor 31 may be configured to receive the acoustic wave signal, convert the received acoustic wave signal into an electrical signal, and output the converted electrical signal. The acoustic wave sensor 31 may include a microphone, a piezo sensor, and the like.

Additionally, the MCU 35 may be configured to analyze the signal transmitted from the acoustic wave sensor 31 to generate the control signal that corresponds to the opening or closing of the door 5. In addition, the control signal generated by the MCU 35 may be transmitted to the controller 20, and the controller 20 may be configured to operate the driving unit 10 according to the control signal. The MCU 35 may be mounted on a printed circuit board (PCB), and a connector, various electronic components, and the like may also be mounted on the PCB.

Meanwhile, force may be exerted onto the door 5 by a user such as a finger, a knuckle, a fist, and an elbow, or other objects such as gloves, a stick, and a golf club. In other words, a recognizable pattern may be variously controlled based on pattern recognition levels of the MCU 35. In addition, an input position of knocking or beating applied to the door 5 may be set with respect to the entirety of the door 5, or may also be set to a limited area adjacent to a door handle of the door 5. The input position of knocking or beating may be changed based on pattern recognition levels of the MCU 35.

The controller 20 may be connected to a first receiving line 21 configured to receive the control signal generated by the acoustic wave processing unit 30 and a second receiving line 22 configured to receive a control signal generated by an operation unit 28. Particularly, the operation unit 28 may be an operation button, an operation handle, and the like, disposed inside of the door or proximate to a driver seat of the vehicle. The controller 20 may include a first connector 20a connected to the first receiving line 21 and a second connector 20b connected to the second receiving line 22. Thus, the acoustic wave processing unit 30 may be connected to the first connector 20a of the controller 20 via the first receiving line 21, and the operation unit 28 may be connected to the second connector 20b of the controller 20 via the second receiving line 22. In other words, the acoustic wave processing unit 30 and the operation unit 28 may be connected in parallel to the controller 20.

As described above, since the acoustic wave processing unit 30 and the operation unit 28 may be connected in parallel to the controller 20, the control signal for opening or closing of the door 5 may be selectively generated by the acoustic wave processing unit 30 or the operation unit 28 and may then be transmitted to the controller 20, and thus, operational convenience for opening and closing of the door 5 may be improved. In addition, since the acoustic wave processing unit 30 and the operation unit 28 may be connected in parallel to the controller 20, even when the acoustic wave processing unit 30 and the first receiving line 21 are selectively separated in accordance with circumstances, the operation unit 28 may be connected to the controller 20 via the second receiving line 22, and thus, the operation mechanism of the power door may be maintained.

Meanwhile, the acoustic wave sensor 31 and the MCU 35 may be disposed within the door (e.g., inside of the door), and thus, they may be concealed and more stably protected from external factors. In particular, the acoustic wave sensor 31 and the MCU 35 may be disposed in appropriate positions between an external panel, an internal panel, and/or an internal trim of the door, and the arrangement of the acoustic wave sensor 31 and the MCU 35 may be changed according to types of the door, driving methods of the door, specifications of the vehicle.

Figure 2:
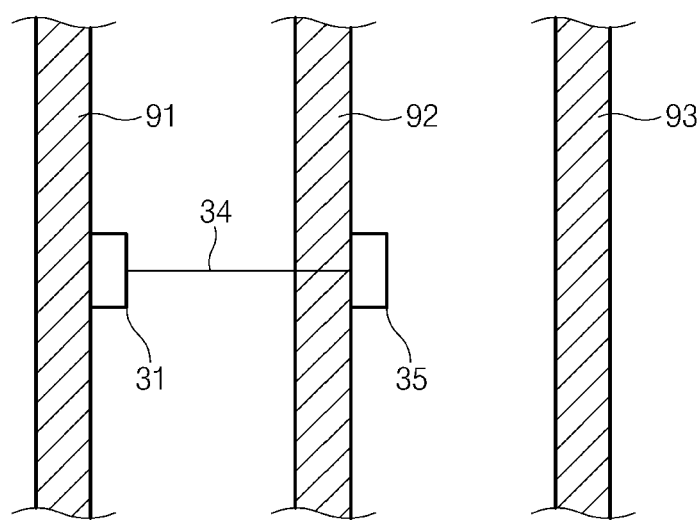
FIG. 2 illustrates an acoustic wave sensor and a micro control unit (MCU) of an apparatus for controlling opening and closing of a vehicle door, which are disposed within the door, according to an exemplary embodiment of the present disclosure.

According to an exemplary embodiment illustrated in FIG. 2, a door 90 may include an external panel 91, an internal panel 92 positioned inwardly of the external panel 91 (e.g., positioned at an inside position of or at an internal side of), and an internal trim 93 positioned inwardly of the internal panel 92 (e.g., positioned at an inside position of or at an internal side of). The acoustic wave sensor 31 may be disposed on the external panel 91 of the door 90, and the MCU 35 may be disposed on the internal panel 92 or the internal trim 93 of the door 90. The acoustic wave sensor 31 and the MCU 35 may be electrically connected via a wire or cable 34, and the wire or cable 34 may pass through the internal panel 92 or the internal trim 93. A signal output from the acoustic wave sensor 31 may be stably transmitted to the MCU 35 via the wire or cable 34.

In the exemplary embodiment of FIG. 2, an acoustic wave signal may be generated by force applied from the outside of the door 90, and the acoustic wave sensor 31 may be configured to receive the acoustic wave and convert the received acoustic wave signal into an electrical signal, and the MCU 35 may be configured to analyze the electrical signal and generate a control signal. The door 90, according to the exemplary embodiment of FIG. 2, may be a power sliding door 90 that may be opened or closed by sliding along a side surface of a vehicle. When forced is exerted onto the external panel 91 of the power sliding door 90, the acoustic wave sensor 31 may be configured to receive the acoustic wave signal and convert the received acoustic wave signal into the electrical signal, and when the electrical signal output from the acoustic wave sensor 31 is transmitted to the MCU 35, the MCU 35 may be configured to analyze the signal from the acoustic wave sensor 31 and generate the control signal for opening or closing the power sliding door 90.

Alternatively, the door 90, according to the exemplary embodiment of FIG. 2, may be various types of power door, such as a gull-wing door, a sun roof, and a power back door. According to an exemplary embodiment illustrated in FIG. 3, a door 80 may include an external panel 81, an internal panel 82 positioned inwardly of the external panel 81 (e.g., positioned at an interior side of the external panel), and an internal trim 83 positioned inwardly of the internal panel 82 (e.g., positioned at an interior side of the external panel). The acoustic wave sensor 31 may be disposed on the internal trim 83 of the door 80, and the MCU 35 may be disposed on the internal panel 82 of the door 80. The acoustic wave sensor 31 and the MCU 35 may be electrically connected via the wire or cable 34, and the wire or cable 34 may pass through the internal panel 82. A signal output from the acoustic wave sensor 31 may be stably transmitted to the MCU 35 via the wire or cable 34.

Figure 3:
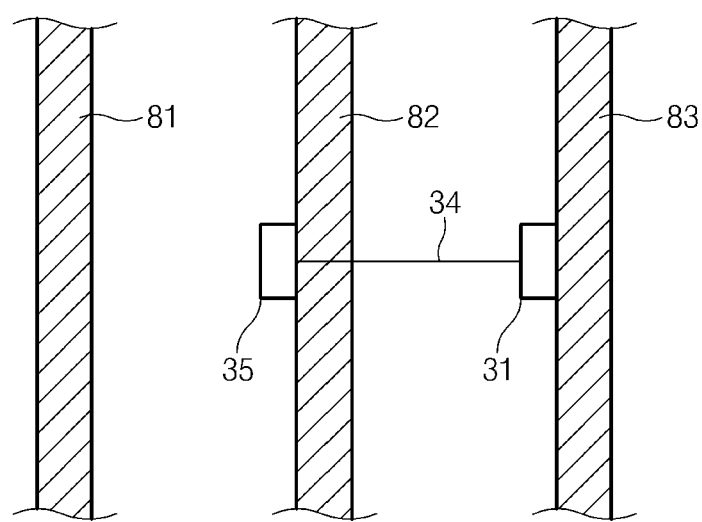
FIG. 3 illustrates an acoustic wave sensor and an MCU of an apparatus for controlling opening and closing of a vehicle door, according to another exemplary embodiment of the present disclosure.

In the exemplary embodiment of FIG. 3, an acoustic wave signal may be generated by force applied from the inside of the door 80, and the acoustic wave sensor 31 may be configured to receive the acoustic wave signal and convert the received acoustic wave signal into an electrical signal, and the MCU 35 may then be configured to analyze the electrical signal and generate a control signal. The door 80, according to the exemplary embodiment of FIG. 3, may be a sun roof 80 disposed in a ceiling of a vehicle. When force is exerted onto the internal trim 83 of the sun roof 80, the acoustic wave sensor 31 may be configured to receive the acoustic wave signal and convert the received acoustic wave signal into the electrical signal, and when the electrical signal output from the acoustic wave sensor 31 is transmitted to the MCU 35, the MCU 35 may be configured to analyze the signal from the acoustic wave sensor 31 and generate the control signal for opening or closing the sun roof 80.

Alternatively, the door 80, according to the exemplary embodiment of FIG. 3, may be various types of power door, such as a power sliding door and a gull-wing door. According to an exemplary embodiment illustrated in FIG. 4, a door 70 may include an external panel 71, an internal panel 72 positioned inwardly of the external panel 71 (e.g., positioned at an interior side of the external panel), and an internal trim 73 positioned inwardly of the internal panel 72 (e.g., positioned at an interior side of the external panel). Two acoustic wave sensors 31 may be disposed on the external panel 71 and the internal trim 73 of the door 70, respectively, and the MCU 35 may be disposed on the internal panel 72 of the door 70. The acoustic wave sensors 31 and the MCU 35 may be electrically connected via the wire or cable 34, and the wire or cable 34 may pass through the internal panel 72. A signal output from each of the acoustic wave sensors 31 may be stably transmitted to the MCU 35 via the wire or cable 34.

Figure 4:
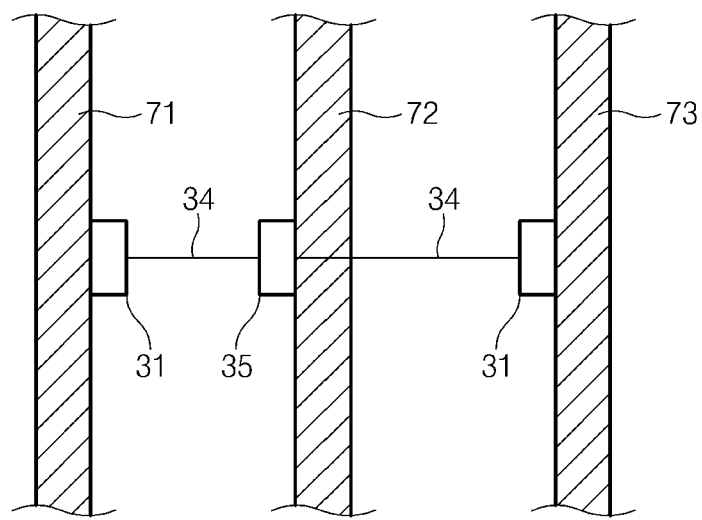
FIG. 4 illustrates an acoustic wave sensor and an MCU of an apparatus for controlling opening and closing of a vehicle door, according to another exemplary embodiment of the present disclosure.

In the exemplary embodiment of FIG. 4, an acoustic wave signal may be generated by force applied from the inside and outside of the door 70, and the acoustic wave sensors 31 may be configured to receive the acoustic wave signal and convert the received acoustic wave signal into an electrical signal, and the MCU 35 may be configured to analyze the electrical signal and generate a control signal related to opening of the door. In particular, the door 70, according to the exemplary embodiment of FIG. 4, may be a power back door 70 opened and closed at the back of a vehicle. When force is exerted onto the external panel 71 when the power back door 70 is closed or when force is exerted onto the internal trim 73 when the power back door 70 is opened, each of the acoustic wave sensors 31 may be configured to receive the acoustic wave signal and convert the received acoustic wave signal into the electrical signal. When the electrical signal output from each of the acoustic wave sensors 31 is transmitted to the MCU 35, the MCU 35 may be configured to analyze the signal from each of the acoustic wave sensors 31 and generate the control signal for opening or closing of the power back door 70. Alternatively, the door 70, according to the exemplary embodiment of FIG. 4, may be various types of power door, such as a power sliding door, a gull-wing door, and a sun roof.

Figure 5:
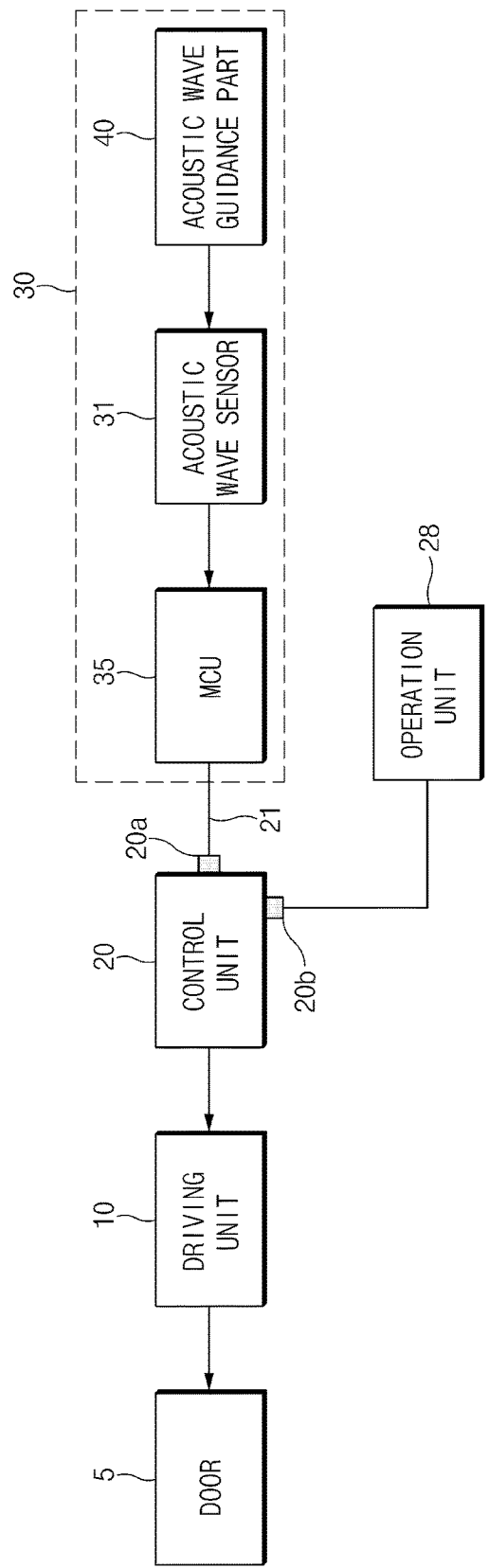
FIG. 5 is a block diagram illustrating an apparatus for controlling opening and closing of a vehicle door, according to exemplary embodiments of the present disclosure.

According to an exemplary embodiment illustrated in FIG. 5, the acoustic wave processing unit 30 may further include an acoustic wave guidance part 40 configured to guide an acoustic wave signal to the acoustic wave sensor 31. In particular, the acoustic wave guidance part 40 may be configured to transmit the acoustic wave signal generated by force applied from the inside or outside of a door 60 to the acoustic wave sensor 31.

Figure 6:
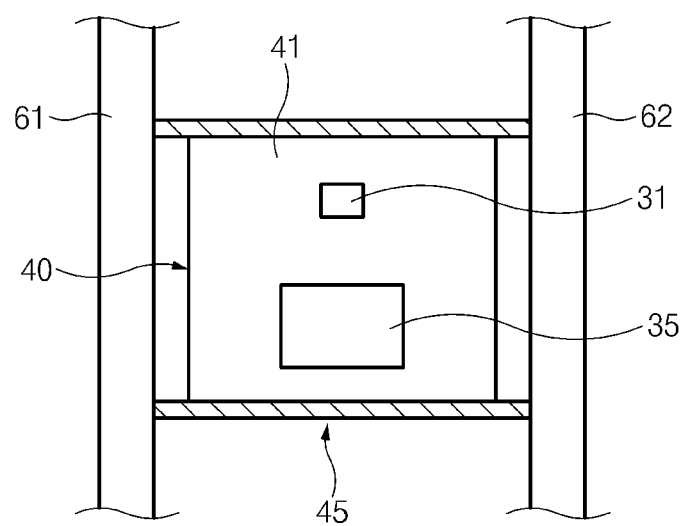
FIG. 6 is a cross-sectional view illustrating a state in which an acoustic wave guidance part of the apparatus for controlling opening and closing of a vehicle door illustrated in FIG. 5 is disposed within the door according to an exemplary embodiment of the present disclosure.
Figure 7:
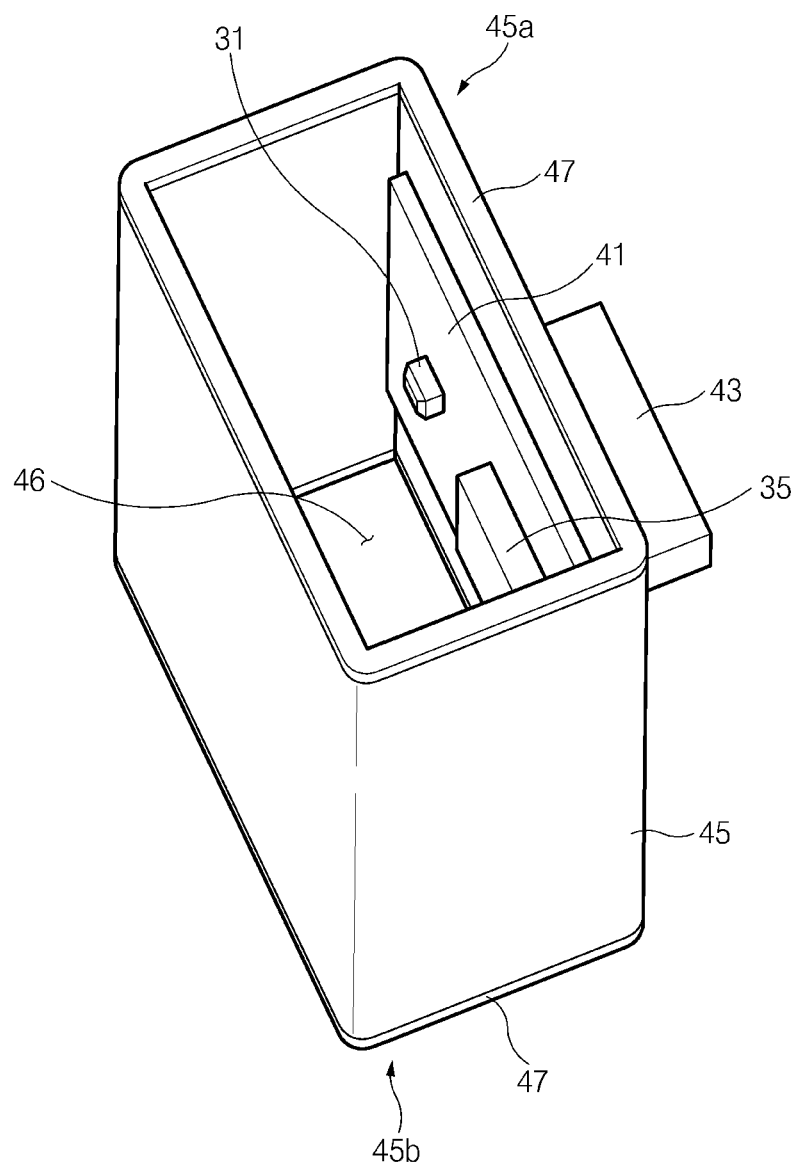
FIG. 7 is a cross-sectional view illustrating a state in which an acoustic wave guidance housing of an apparatus for controlling opening and closing of a vehicle door is interposed between an internal trim and an external panel of a back door, according to an exemplary embodiment of the present disclosure.

Referring to FIG. 6, the door 60 may include an external panel 61 and an internal trim 62 positioned inwardly of the external panel 61 (e.g. positioned on an internal side of the external panel 61). The acoustic wave guidance part 40 may include an acoustic wave guidance housing 45 interposed between the internal trim 62 and the external panel 61 of the door 60. As illustrated in FIG. 7, the acoustic wave guidance housing 45 may have a cylindrical or box shaped structure in which an acoustic wave guidance space 46 configured to guide an acoustic wave signal is formed, and the acoustic wave guidance space 46 may be disposed between the internal trim 62 and the external panel 61. The acoustic wave sensor 31 and the MCU 35 may be disposed in the acoustic wave guidance space 46, and the acoustic wave sensor 31 and the MCU 35 may be electrically connected to a PCB 41. The PCB 41 may be stably supported in the acoustic wave guidance space 46.

Due to the above-described configuration, the acoustic wave may be generated as external force is exerted onto the internal trim 62 or the external panel 61 of the door 60, and the acoustic wave signal may be guided to the acoustic wave sensor 31 through the acoustic wave guidance space 46 of the acoustic wave guidance housing 45. The acoustic wave guidance housing 45 may include a first opening 45a in contact with (e.g., facing) the internal trim 62, and a second opening 45b in contact with (e.g., facing) the external panel 61. Additionally, gaskets 47 may be attached to the first opening 45a and the second opening 45b, respectively (e.g., attached to the outer edges of the opening). Since the gaskets 47 are closely attached to (e.g., abut) the internal trim 62 and the external panel 61, respectively, the first opening 45a and the second opening 45b of the acoustic wave guidance housing 45 may be sealed by the internal trim 62 and the external panel 61, respectively. Since the acoustic wave guidance housing 45 is sealed, the acoustic wave may be more stably transmitted without loss, and the transmission of an external noise to the acoustic wave sensor 31 may be blocked.

Figure 8:
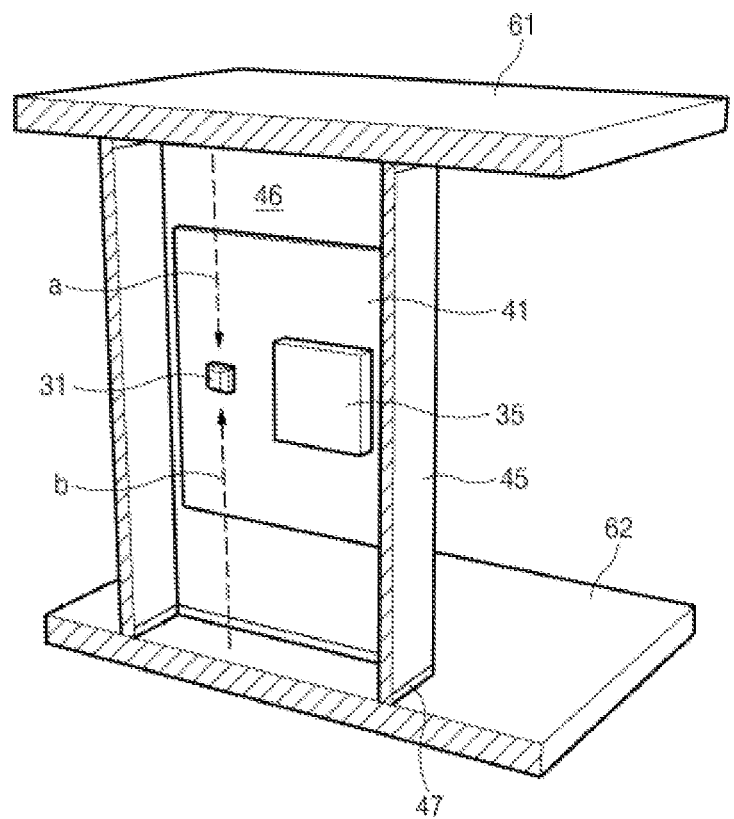
FIG. 8 is a partially cut-away perspective view illustrating a state in which an acoustic wave guidance housing of an apparatus for controlling opening and closing of a vehicle door is interposed between an internal trim and an external panel of a back door, according to an exemplary embodiment of the present disclosure.

As illustrated in FIG. 8, when external force is exerted onto the external panel 61, vibrations due to the force (e.g., knocking or beating) of the external panel 61 may be converted into an acoustic wave signal of the external panel 61, and the acoustic wave may pass through the acoustic wave guidance space 46 of the acoustic wave guidance housing 45 to be guided in a direction indicated by arrow a (e.g., a downward direction), and thus, the acoustic wave sensor 31 may be configured to receive the corresponding acoustic wave. When the user knocks or exerts force onto the internal trim 62, vibrations due to the force on the internal trim 62 may be converted into an acoustic wave signal of the internal trim 62, and the acoustic wave may pass through the acoustic wave guidance space 46 of the acoustic wave guidance housing 45 to be guided in a direction indicated by arrow b (e.g., an upward direction), and thus, the acoustic wave sensor 31 may be configured to receive the corresponding acoustic wave.

The door 60, according to the exemplary embodiment illustrated in FIGS. 5 to 8, may be a power back door provided to be opened or closed at the back of the vehicle. A control signal for opening or closing the power back door 60 may be generated in response to receiving and analyzing the acoustic wave signal generated due to the force applied to the inside or outside of the power back door 60. In particular, the power back door may be a power trunk lid, a power tail gate, a power lift gate, and the like. Alternatively, the door 60, according to the exemplary embodiment of FIGS. 5 to 8, may be various types of power door, such as a power sliding door, a gull-wing door, and a sun roof.

Figure 9:
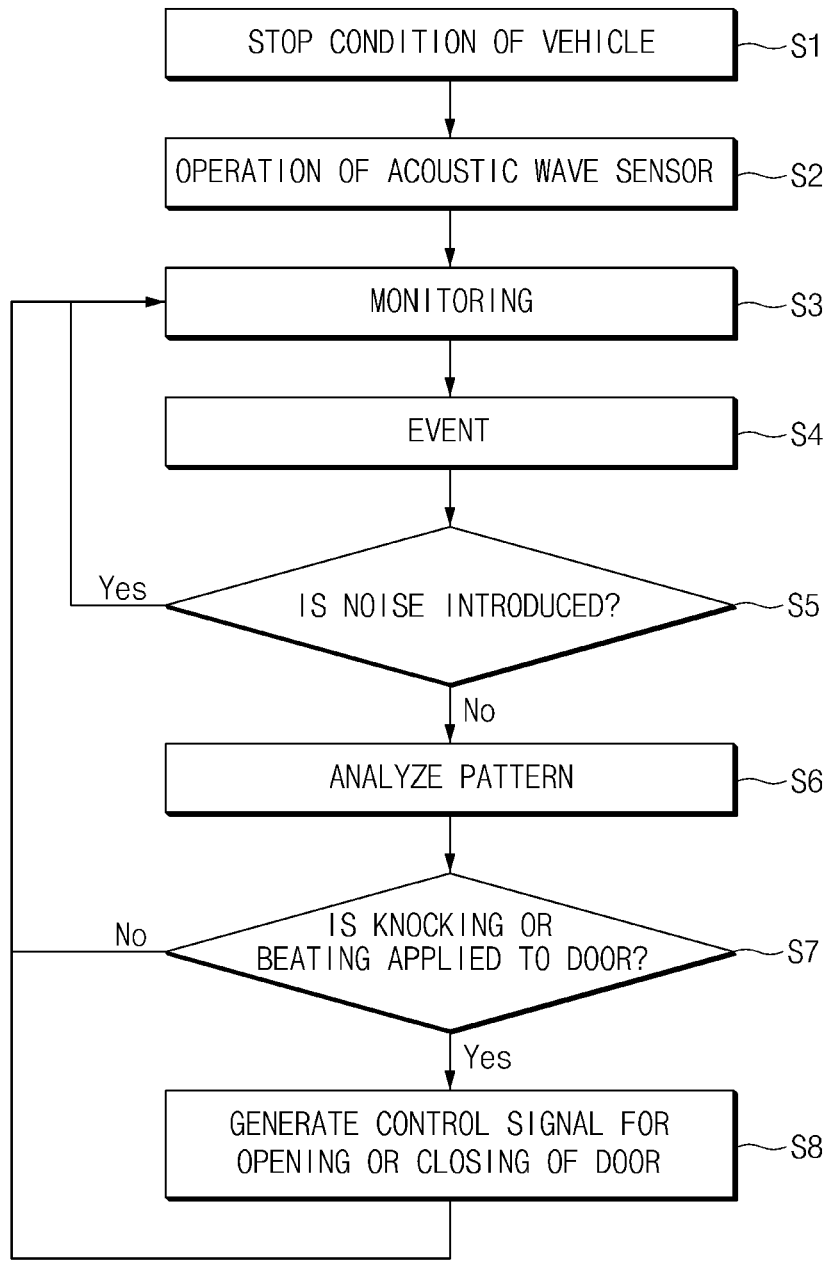
FIG. 9 is a flowchart illustrating a method for controlling opening and closing of a vehicle door, according to exemplary embodiments of the present disclosure.

FIG. 9 is a flowchart illustrating a method for controlling opening and closing of a vehicle door, according to exemplary embodiments of the present disclosure. When a vehicle satisfies a stop condition in operation 51, the acoustic wave sensor 31 may start to operate in operation S2. According to an exemplary embodiment, the stop condition (51) of the vehicle may be a condition in which a door is unlocked and the vehicle is in a stopped state (e.g., in "P" (park) gear).

According to another exemplary embodiment, in a vehicle provided with a remote controller including a door lock button such as a smart key, the stop condition (51) of the vehicle may be a condition in which the remote controller is within a predetermined range of the vehicle door and the door is locked after the vehicle is stopped. After the acoustic wave sensor 31 starts to operate in operation S2, when an acoustic wave signal generated due to a force exerted onto one side of the door 5 is received by the acoustic wave sensor 31, the acoustic wave sensor 31 may be configured to convert the received acoustic wave into an electrical signal and transmit the electrical signal to the MCU 35. Further, the MCU 35 may be configured to continuously monitor the received electrical signal at a constant time-interval, i.e., a monitoring interval (S3). For example, the monitoring interval may be about 20 ms, and the MCU 35 may be configured to monitor the electrical signal received from the acoustic wave sensor 31 with the monitoring interval of about 20 ms.

When the MCU 35 detects that energy of the electrical signal monitored at constant monitoring intervals exceeds a threshold at a particular point in time, the MCU 35 may be configured to detect an event, i.e., the knocking or beating applied to the door in operation S4. In particular, the threshold may be changed based on types, specifications, opening and closing conditions, and the like of the door. After the occurrence of the event, the MCU 35 may be configured to store information regarding the electrical signal within a predetermined time range until the point in time at which the energy of the electrical signal exceeds the threshold (i.e., the time of occurrence of the event). For example, when the electrical signal monitored at about 20 ms intervals exceeds the threshold at a particular point in time, the MCU 35 may be configured to store the information of the electrical signal in a time range of about 100 ms or about 120 ms until the point in time at which the electrical signal exceeds the threshold.

After the occurrence of the event (e.g., after the external force is detected), the MCU 35 may be configured to determine whether an external noise is introduced into the electrical signal in operation S5. In response to determining that the external noise is introduced into the electrical signal, the MCU 35 may be configured to repeatedly monitor the electrical signal from the acoustic wave sensor 31 at the constant monitoring intervals. In addition, in response to determining that the external noise is not introduced into the electrical signal, a pattern of the electrical signal (i.e., an acoustic wave pattern) corresponding to the acoustic wave generated by the force may be analyzed in operation S6. Particularly, a time domain, a frequency domain, or the like may be used in the analysis of the pattern. In the time domain method, the pattern of the signal may be analyzed using an energy flow pattern, an initial period of the signal, an initial phase of the signal, positions of initial maximum/minimum values of the signal, and the like. In the frequency domain method, the pattern of the signal may be analyzed using a natural frequency, an energy ratio according to frequency domain, an energy pattern according to frequency domain, and the like.

Furthermore, the MCU 35 may be configured to determine whether the external force is exerted onto the door 5 to generate an opening or closing control signal using the above-described analysis of the acoustic wave pattern in operation S7. In response to determining, by the analysis of the acoustic wave pattern, that an external force is applied for opening or closing of the door 5, the MCU 35 may be configured to generate the control signal for opening or closing the door 5 in operation S8. The MCU 35 may be configured to transmit the control signal to the controller 20. The controller 20 may then be configured to operate the driving unit 10 using the received control signal, and the driving unit 10 may be configured to open or close the door 5 based on the control signal. Thereafter, returning to operation S3, the MCU 35 may be configured to repeatedly monitor the electrical signal from the acoustic wave sensor 31 at the constant monitoring intervals. When the vehicle is out of the stop condition (e.g., the vehicle speed is greater than 0, the vehicle is no longer in the P gear, or the like), all of the above-described operations may be stopped.

Figure 10:
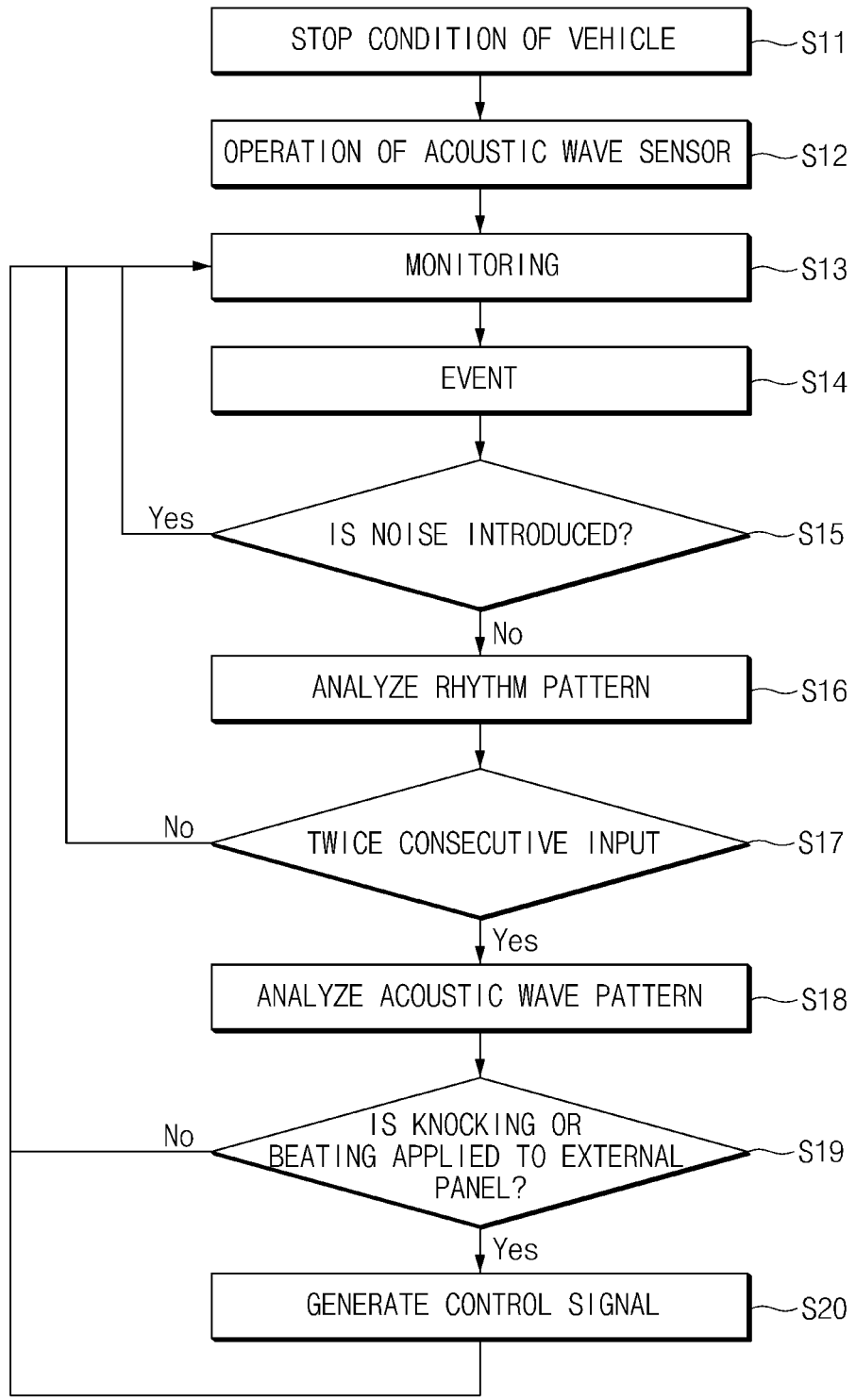
FIG. 10 is a flowchart illustrating a method for controlling opening and closing of a vehicle door, according to exemplary embodiments of the present disclosure.

FIG. 10 is a flowchart illustrating a method for controlling opening and closing of a vehicle door, according to exemplary embodiments of the present disclosure. When a vehicle satisfies a stop condition in operation S11, the acoustic wave sensor 31 may start to operate in operation S12. According to an exemplary embodiment, the stop condition (S11) of the vehicle may be a condition in which a door is unlocked and the vehicle is stopped (e.g., in "P" (park) gear). According to another exemplary embodiment, in a vehicle provided with a remote controller including a door lock button such as a smart key, the stop condition (S11) of the vehicle may be a condition in which the remote controller is within a predetermined distance range to the vehicle door and the door is locked after the vehicle is stopped.

After the acoustic wave sensor 31 starts to operate in operation S12, when an acoustic wave signal generated due to an external force applied to the external panel 91 of the door 90 is received by the acoustic wave sensor 31, the acoustic wave sensor 31 may be configured to convert the received acoustic wave into an electrical signal and transmit the electrical signal to the MCU 35. The MCU 35 may then be configured to continuously monitor the received electrical signal at a constant time-interval, i.e., a monitoring interval in operation S13. For example, the monitoring interval may be about 20 ms, and the MCU 35 may be configured to monitor the electrical signal received from the acoustic wave sensor 31 with the monitoring interval of about 20 ms.

When the MCU 35 detects that energy of the electrical signal monitored at constant monitoring intervals exceeds a threshold at a particular point in time, the MCU 35 may be configured to detect an event, i.e., the knocking or beating applied to the door in operation S14. The threshold may be changed based on types, specifications, opening and closing conditions, and the like of the door. After the occurrence of the event, the MCU 35 may be configured to determine whether an external noise is introduced into the electrical signal in operation S15. Returning to operation S13 in response to determining that the external noise is introduced into the electrical signal, the MCU 35 may be configured to repeatedly monitor the electrical signal from the acoustic wave sensor 31 at the constant monitoring intervals.

Further, in response to determining that the external noise is not introduced into the electrical signal, the MCU 35 may be configured to store an interval of event occurrence (e.g., interval occurrence of force being exerted onto the door panel) and analyze whether the interval of the event occurrence is within a predetermined range to determine whether a rhythm pattern of the knocking or beating applied to the door 90 corresponds to a rhythm pattern for opening or closing of the door 90 in operation S16. For example, the predetermined range may be set to about 300-500 ms.

Through the above-described analysis of the rhythm pattern, the MCU 35 may be configured to determine whether the knocking or beating applied to the door 90 is input at least twice consecutively in operation S17. For example, when the interval of the event occurrence is within a predetermined range of about 300-500 ms, the MCU 35 may be configured to determine that the knocking or beating applied to the external panel 91 of the door 90 is input at least twice consecutively. Thus, the MCU 35 may be configured to detect patterns in the received signals to thus correspond the patterns with opening and closing signals to thus cause the driving unit to be appropriately operated to open or close the door.

Particularly, when the knocking or beating is input at least twice consecutively, the MCU 35 may be configured to recognize the force as an input for opening or closing of the door 90. In response to determining that the knocking or beating applied to the door 90 is input at least twice consecutively, the MCU 35 may be configured to store information of the electrical signal within a predetermined time range until the point in time at which the electrical signal exceeds the threshold due to a last input knocking or beating (i.e., the time of occurrence of the last event). For example, when the electrical signal monitored at about 20 ms intervals exceeds the threshold due to the last input knocking or beating (that is, when the last knocking event occurs), the MCU 35 may be configured to store the information of the electrical signal in a time range of about 100 ms or 120 ms until the point in time at which the electrical signal exceeds the threshold.

Thereafter, a pattern of the electrical signal (i.e., an acoustic wave pattern) corresponding to the acoustic wave generated by the knocking or beating may be analyzed in operation S18. Here, a time domain, a frequency domain, or the like may be used in the analysis of the pattern. In the time domain method, the pattern of the signal may be analyzed using an energy flow pattern, an initial period of the signal, an initial phase of the signal, positions of initial maximum/minimum values of the signal, and the like. In the frequency domain method, the pattern of the signal may be analyzed using a natural frequency, an energy ratio according to frequency domain, an energy pattern according to frequency domain, and the like.

Through the above-described analysis of the acoustic wave pattern, it may be determined whether or not the knocking or beating is applied to the external panel 91 of the door 90 in operation S19. When it is determined through the analysis of the acoustic wave pattern that the knocking or beating is applied for opening or closing of the door 90, the MCU 35 may generate a control signal for opening or closing of the door 90 in operation S20. Then, the MCU 35 may transmit the control signal to the controller 20. The controller 20 may control the driving unit 10 using the received control signal, and the driving unit 10 may open or close the door 90 according to the control signal. Thereafter, returning to operation S13, the MCU 35 may be configured to repeatedly monitor the electrical signal from the acoustic wave sensor 31 at the constant monitoring intervals. When the vehicle is out of the stop condition (e.g., the vehicle is moving or no longer parked), all of the above-described operations may be stopped.

Moreover, to open or close the power sliding door 90 according to the exemplary embodiment of FIG. 2, the method according to the exemplary embodiment of FIG. 10 may be used as a method for controlling the opening and closing of the power sliding door by receiving and analyzing the acoustic wave signal generated by knocking or beating the external panel 91 of the sliding door 90. Alternatively, the method according to the exemplary embodiment of FIG. 10 may also be used in the same or similar manner for the structure of a sun roof having the acoustic wave sensor 31 disposed on the internal trim 83 of the door 80 as in the exemplary embodiment of FIG. 3.

Figure 11:
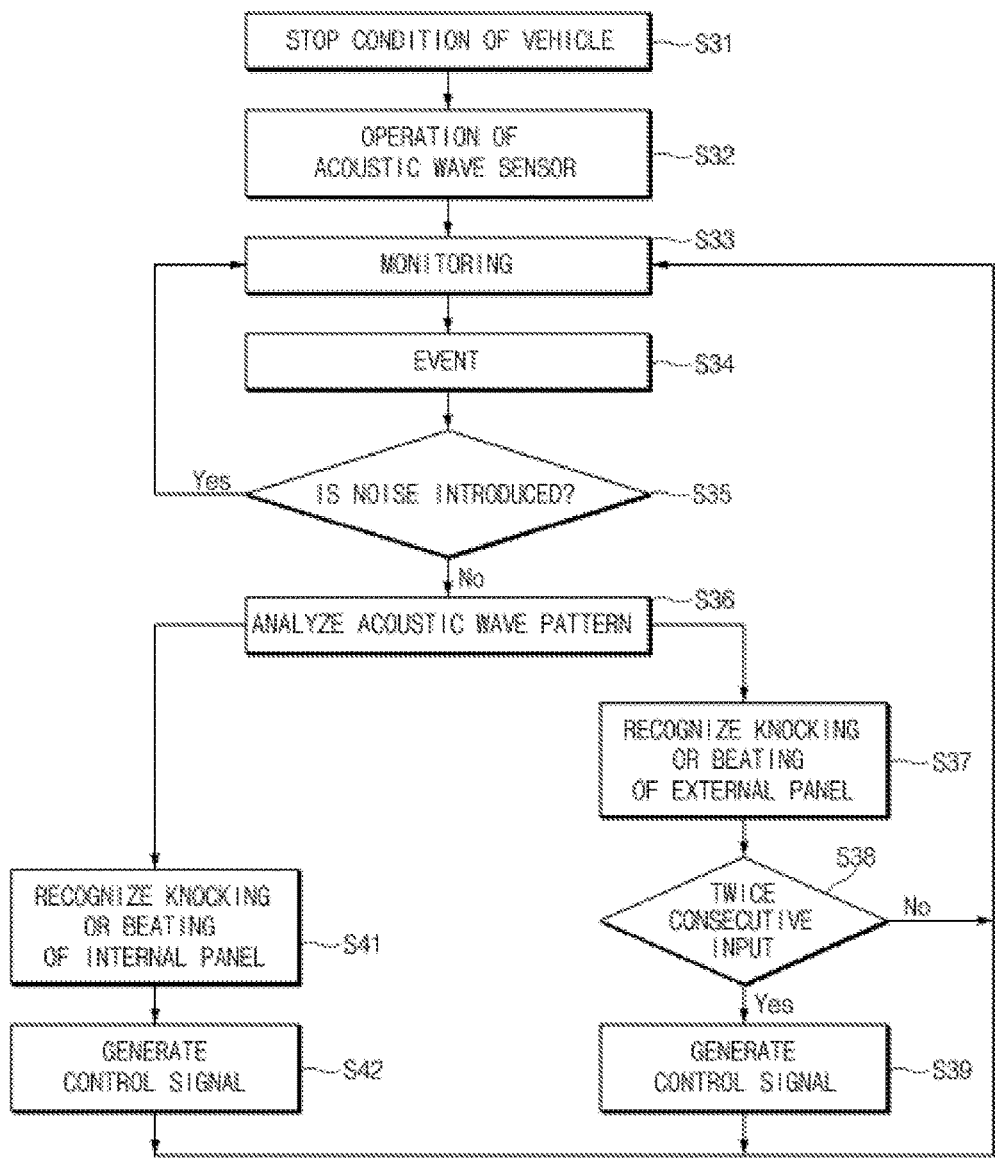
FIG. 11 is a flowchart illustrating a method for controlling opening and closing of a vehicle door, according to exemplary embodiments of the present disclosure.

FIG. 11 is a flowchart illustrating a method for controlling opening and closing of a vehicle door, according to exemplary embodiments of the present disclosure. In particular, to open or close the power back door 60 in the exemplary embodiment of FIG. 6, the present exemplary embodiment illustrated in FIG. 11 relates to a method for controlling opening and closing of the power back door by receiving and analyzing an acoustic wave signal generated by forced exerted onto the external panel 61 of the back door 60 or the internal trim 62 of the back door 60 when the back door 60 is opened. When a vehicle satisfies a stop condition in operation S31, the acoustic wave sensor 31 may start to operate in operation S32.

According to an exemplary embodiment, the stop condition (S31) of the vehicle may be a condition in which a door is unlocked and the vehicle is stopped (e.g., in "P" (park) gear). According to another exemplary embodiment, in a vehicle provided with a remote controller including a door lock button such as a smart key, the stop condition (S31) of the vehicle may be a condition in which the remote controller is within a predetermined distance range to the vehicle door and the door is locked after the vehicle is stopped.

After the acoustic wave sensor 31 starts to operate in operation S32, when an acoustic wave signal generated due to the external force applied to the external panel 61 or the internal trim 62 of the door 60 is received by the acoustic wave sensor 31, the acoustic wave sensor 31 may be configured to convert the received acoustic wave into an electrical signal and transmit the electrical signal to the MCU 35. Further, the MCU 35 may be configured to continuously monitor the received electrical signal at a constant time-interval, i.e., a monitoring interval in operation S33. For example, the monitoring interval may be about 20 ms, and the MCU 35 may be configured to monitor the electrical signal received from the acoustic wave sensor 31 with the monitoring interval of about 20 ms.

When the MCU 35 detects that energy of the electrical signal monitored at constant monitoring intervals exceeds a threshold at a particular point in time, the MCU 35 may be configured to recognize the occurrence of an event, i.e., the knocking or beating applied to the door in operation S34. The threshold may be changed according to types, specifications, opening and closing conditions, and the like of the door. After the occurrence of the event (e.g., after the force is exerted onto the door), the MCU 35 may be configured to determine whether an external noise is introduced into the electrical signal in operation S35. Returning to operation S33 in response to determining that the external noise is introduced into the electrical signal, the MCU 35 may be configured to repeatedly monitor the electrical signal from the acoustic wave sensor 31 at constant monitoring intervals.

After the occurrence of the event, the MCU 35 may be configured to store information of the electrical signal within a predetermined time range until the point in time at which the energy of the electrical signal exceeds the threshold (i.e., the time of occurrence of the event).

For example, when the electrical signal monitored at about 20 ms intervals exceeds the threshold at a particular point in time, the MCU 35 may be configured to store the information of the electrical signal in a time range of about 100 ms or 120 ms until the point in time at which the electrical signal exceeds the threshold. The MCU 35 may be configured to determine whether an external noise is introduced into the electrical signal in operation S35. Returning to operation S33 in response to determining that the external noise is introduced into the electrical signal, the MCU 35 may be configured to repeatedly monitor the electrical signal from the acoustic wave sensor 31 at constant monitoring intervals.

Additionally, in response to determining that the external noise is not introduced into the electrical signal, a pattern of the electrical signal (i.e., an acoustic wave signal pattern) that corresponds to the acoustic wave signal generated by the force exerted onto the door may be analyzed in operation S36. In particular, a time domain, a frequency domain, or the like may be used in the analysis of the pattern. In the time domain method, the pattern of the signal may be analyzed using an energy flow pattern, an initial period of the signal, an initial phase of the signal, positions of initial maximum/minimum values of the signal, and the like. In the frequency domain method, the pattern of the signal may be analyzed using a natural frequency, an energy ratio according to frequency domain, an energy pattern according to frequency domain, and the like.

When the back door 60 is closed and when a first force is exerted onto the external panel 61 of the back door 60 to open the back door 60, the analyzed pattern may be recognized as the knocking or the like applied to the external panel 61 of the back door 60 in operation S37. After the first knocking or exerted force, the MCU 35 may be configured to determine whether a second knocking or force is applied within a predetermined period of time (e.g., within about 300-500 ms) in operation S38. When the knocking or force is applied to the external panel 61 of the back door 60 twice consecutively, the control signal for opening or closing of the back door 60 may be generated in operation S39. The MCU 35 may be configured to transmit the control signal to the controller 20. The controller 20 may then be configured to operate the driving unit 10 using the control signal, and the driving unit 10 may be configured to open or close the door 60 according to the control signal. Thereafter, returning to operation S33, the MCU 35 may be configured to repeatedly monitor the electrical signal from the acoustic wave sensor 31 at the constant monitoring intervals.

As stated above, the back door 60 may be opened more conveniently by knocking or force exerted onto the external panel 61 when the back door 60 is closed. In particular, to open the back door 60 when the back door 60 is closed, external force may be applied to the external panel 61 of the back door 60 twice consecutively, whereby unintended opening of the back door 60 may be prevented. To stop in the middle of opening the back door 60 according to the control signal, the opening operation may be stopped by touching (e.g., knocking or beating) the external panel 61 twice or touching (e.g., knocking or beating) the internal trim 62 once. In other words, when a consecutive force is applied to the door, the opening execution of the door may be reversed or stopped.

Additionally, when the back door 60 is opened and external force is applied to the internal trim 62 of the back door 60 to close the back door 60, the analyzed pattern may be recognized as the touching or force (e.g., knocking or beating) applied to the internal trim 62 of the back door 60 in operation S41. When the force applied to the internal trim 62 of the back door 60 is recognized, the control signal for opening or closing of the back door 60 may be generated in operation S42. The MCU 35 may then be configured to transmit the control signal to the controller 20. The controller 20 may be configured to operate the driving unit 10 using the control signal, and the driving unit 10 may be configured to open or close the door 60 according to the control signal. Thereafter, returning to operation S33, the MCU 35 may be configured to repeatedly monitor the electrical signal from the acoustic wave sensor 31 at the constant monitoring intervals.

To stop in the middle of closing the back door 60 according to the control signal, the closing operation may be stopped by touching (e.g., knocking or beating) the external panel 61 twice or touching (e.g., knocking or beating) the internal trim 62 once. Even in the middle of the operation of opening or closing the back door 60, the touching of the external panel 61 or the internal trim 62 may be continuously monitored, and thus, the opening, closing, stopping, and the like of the back door 60 may be performed in accordance with the pattern recognition. When the vehicle is no longer in a stopped state, all of the above-described operations may be stopped.

Meanwhile, the method according to the exemplary embodiment of FIG. 11 is described as an example of the method for controlling the opening and closing of the back door 60 provided with the acoustic wave guidance part 40 as in the exemplary embodiment of FIG. 6, but is not limited thereto. For example, the method according to the exemplary embodiment of FIG. 11 may also be used for the door 70 having the two acoustic wave sensors 31 disposed on the external panel 71 and the internal trim 73, respectively, as in the exemplary embodiment of FIG. 4. As set forth above, the opening and closing of the door may be executed by generating the acoustic wave signal due to vibrations when forced is exerted onto the door by the user and converting the acoustic wave signal into the control signal, whereby the opening and closing operations of the door may be performed more easily and conveniently.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling opening and closing of a vehicle door, comprising:
    a driving unit configured to open and close a door;
    a controller configured to operate the driving unit; and
    an acoustic wave processing unit that includes an acoustic wave sensor disposed within the door and configured to receive an acoustic wave signal generated by force applied onto the door to generate a control signal for opening and closing of the door, a micro control unit (MCU) configured to analyze the acoustic wave signal output from the acoustic wave sensor to generate the control signal, and an acoustic wave guidance part guiding the acoustic wave signal to the acoustic wave sensor,
    wherein the acoustic wave guidance part includes an acoustic wave guidance housing interposed between an internal trim and an external panel of the door, and
    wherein the acoustic wave guidance housing has an acoustic wave guidance space formed therein and configured to guide an acoustic wave signal, a first opening facing the internal trim, a second opening facing the external panel, and gaskets attached to the first opening and the second opening, respectively.

2. The apparatus according to claim 1, wherein the acoustic wave sensor and the MCU are disposed in the acoustic wave guidance space.

3. A method for controlling opening and closing of a vehicle door by receiving and analyzing an acoustic wave signal generated by force exerted onto the door, comprising:
    monitoring, by a controller, the acoustic wave signal generated by the force exerted onto the door when a vehicle satisfies a stop condition;
    detecting, by the controller, an occurrence of an event in which a knocking or beating is applied to the door;
    analyzing, by the controller, whether the interval of the event occurrence is within a predetermined range to determine whether a rhythm pattern of the knocking or beating applied to the door corresponds to a rhythm pattern for opening or closing of the door; and
    generating, by the controller, a control signal for opening or closing of the door by analyzing the monitored acoustic wave signal,
    wherein the acoustic wave signal is guided to an acoustic wave sensor by an acoustic wave guidance part, and
    wherein the acoustic wave guidance part includes an acoustic wave guidance housing interposed between an internal trim and an external panel of the door.

4. The method according to claim 3, wherein the monitoring of the acoustic wave signal includes:
    receiving, by the controller, the acoustic wave signal generated by the force exerted onto the door;
    converting, by the controller, the received acoustic wave signal into an electrical signal; and
    monitoring, by the controller, the converted electrical signal at a constant monitoring interval.

5. The method according to claim 4, further comprising:
    determining, by the controller, whether an external noise is introduced into the electrical signal after monitoring the acoustic wave signal; and
    analyzing, by the controller, a pattern of the monitored electrical signal in response to determining that the external noise is not introduced.

6. The method according to claim 5, further comprising:
    determining, by the controller, whether the force exerted onto the door is input at least twice consecutively between determining the noise introduction and analyzing the pattern.

7. The method according to claim 5, wherein the generating of the control signal includes:
    generating, by the controller, the control signal for opening or closing the door when the analyzed pattern is recognized as the force exerted onto an external panel of the door.

8. The method according to claim 5, wherein the generating of the control signal includes:
    generating, by the controller, the control signal for opening or closing the door when the analyzed pattern is recognized as the force exerted onto an internal trim of the door.

9. The method according to claim 3, wherein the stop condition includes the vehicle state being in a parked position.

10. An apparatus for controlling opening and closing of a vehicle tail gate, comprising:
- a driving unit configured to open and close a door;
- a controller configured to operate the driving unit; and
- an acoustic wave processing unit that includes an acoustic wave sensor disposed within the door and configured to receive an acoustic wave signal generated by force applied onto the door to generate a control signal for opening and closing of the door, a micro control unit (MCU) configured to analyze the acoustic wave signal output from the acoustic wave sensor to generate the control signal, and an acoustic wave guidance part guiding the acoustic wave signal to the acoustic wave sensor,
- wherein the acoustic wave guidance part includes an acoustic wave guidance housing interposed between the internal trim and the external panel of the door, and
- wherein the acoustic wave guidance housing has an acoustic wave guidance space formed therein and configured to guide an acoustic wave signal, a first opening facing the internal trim, a second opening facing the external panel, and gaskets attached to the first opening and the second opening, respectively.

11. A method for controlling opening and closing of a vehicle tail gate by receiving and analyzing an acoustic wave signal generated by force exerted onto the door, comprising:
- monitoring, by a controller, the acoustic wave signal generated by the force exerted onto the door when a vehicle satisfies a stop condition;
- detecting, by the controller, an occurrence of an event in which a knocking or beating is applied to the door;
- analyzing, by the controller, whether the interval of the event occurrence is within a predetermined range to determine whether a rhythm pattern of the knocking or beating applied to the door corresponds to a rhythm pattern for opening or closing of the door; and
- generating, by the controller, a control signal for opening or closing of the door by analyzing the monitored acoustic wave signal,
- wherein the acoustic wave signal is guided to an acoustic wave sensor by an acoustic wave guidance part, and
- wherein the acoustic wave guidance part includes an acoustic wave guidance housing interposed between an internal trim and an external panel of the door.

* * * * *